United States Patent [19]
Porter

[11] Patent Number: 4,494,334
[45] Date of Patent: Jan. 22, 1985

[54] AUXILLIARY FISHING SINKER

[76] Inventor: Carl W. Porter, 315 N. Virginia Ave., Falls Church, Va. 22046

[21] Appl. No.: 429,235

[22] Filed: Sep. 30, 1982

[51] Int. Cl.³ .............................................. A01K 91/00
[52] U.S. Cl. .................................... 43/43.12; 43/43.1
[58] Field of Search .................. 43/43.1, 43.12, 43.14, 43/44.9

[56] References Cited

U.S. PATENT DOCUMENTS

| | | | |
|---|---|---|---|
| 3,224,132 | 12/1965 | Frantz | 43/44.9 |
| 3,738,047 | 6/1973 | Tozer | 43/43.12 |
| 4,173,091 | 11/1979 | Emory, Jr. | 43/43.12 |
| 4,221,068 | 9/1980 | Roemer, Jr. | 43/43.12 |
| 4,300,303 | 11/1981 | Hutson | 43/43.1 |
| 4,408,411 | 10/1983 | Skarnells | 43/44.9 |

FOREIGN PATENT DOCUMENTS 1178240 12/1958 France .................. 43/44.9

Primary Examiner—Nicholas P. Godici
Assistant Examiner—K. Rowan

[57] ABSTRACT

A novel multi-function fishing sinker embodying compact and simple means for locking circumventingly and captively yet freely slidable, to any point between the extremities of the line supporting the heavy weight of a downrigger. The lock is rotarily operated by a torque lever which is an extension of a centrally located threaded cylinder and doubles as a hitch for attachment of the trailing portion of a trolling line. Besides being a sinker, by incorporating the above mentioned functions said sinker enables converting the commonly used downrigger heavy weight—supporting line into a taut, deep reaching guide line, down which, after attachment of the sinker to the guide line and attachment of the trolling line to the hitch on the sinker, as above mentioned, the sinker, upon being released will carry the trolling line and lure down to the chosen trolling depth, which is the level of the heavy weight, upon which the sinker will come to rest, and remain there after the trolling line is pulled free from the sinker, as by a fish. As more fish are caught, one by one the more sinkers will collect one by one in a stack on top of the heavy weight holding the guide wire taut. When the stack has grown to a practical maximum number of sinkers, they, the guideline and the heavy weight tethered to it will be retrieved into the boat.

Thus, the heavy weight and its supporting line, now a guide line only, need be retrieved (from great depth) to attach the trolling line as in the prior art. Instead the frequency of that cumbersome laborious operation, through use of this novel multi-purpose stacking sinker, is reduced probably to only once for every dozen or more fish caught by use of this invention.

14 Claims, 7 Drawing Figures

AUXILLIARY FISHING SINKER

BACKGROUND OF THE INVENTION

This invention relates to a method of hook and line fishing called trolling, and more particularly to trolling deep water, i.e., water 30 to 40 feet deep to several hundreds of feet deep. In recent times deep trolling is done with a machine called a downrigger, which is mounted on the gunwale around the after portion i.e., cockpit of the fishing boat, as illustrated in FIG. 1 herein.

FIG. 1 shows a fisherman engaged in trolling from the cockpit of a boat 18 using apparatus including a downrigger and a regular fishing rod and reel, which are typically employed together. The downrigger is mounted on the gunwale of the boat and includes a special reel 16, which may be either hand-cranked or alternately operated by electric motor. The reel 16 is loaded with a strong, flexible steel line 15 which is strung over a pulley at the end of a stiff horizontal steel rod 17, pointing backwards. The line continues down into the water to a chosen depth, where hopefully the fish are, and where the line is connected to a heavy ball 13 weighing probably 10 to 15 pounds. There are no fish hooks nor lures connected directly to this line, so it has come to be called a dummy line. Its purpose is to support the ball as it is reeled up or down to position the ball at the chosen depth. The purpose of such a heavy ball, which is a sinker, is to carry the trolling tail part of the fishing line down to the chosen depth for trolling and to hold the leading end of the trolling line at that depth and as directly under the back part of the boat as possible, as the boat moves forward. The leading point on the trolling line is tethered to the ball and thirty to forty yards of the fishing line is trolled behind the ball, terminating with the lure 11. The trolling line may be tethered to the ball with any one of several means which provide a joint which will allow the trolling line to slip or break lose from the ball whenever the lure is attacked by a fish, or hung on underwater bottom structure. The tethering system illustrated in FIG. 1 consists of a hook shaped hitch fixed to the ball, and a closed (endless) rubber band wrapped around the fishing line, forming two loops which are then slipped over the hook shaped hitch on the ball.

Normally, a hooked fish will separate the fishing line away from the hitch on the ball, leaving the fish unencumbered by any heavy weight or sinker, giving the fisherman a tougher and more sporting contest before the fish is finally brought into the boat.

The next step is for the fisherman, utilizing the downrigger reel, to wind the dummy line in, raising the ball, and taking the ball and line aboard. The next step is to reattach the proper point on the fishing line to the hitch on the ball. The ball is then eased overboard with the dummy line and allowed to sink down again to the trolling level, carefully playing out fishing line and dummy line at the same rate. This cycle of raising and lowering the ball and dummy line must be repeated each time the lure catches a fish, or is hung on bottom structure.

The above described procedure constitutes the prior art of downrigger or dummy line type trolling for fish. It is productive of fish from water of considerable depth, not otherwise so readily accomplished.

It should be obvious that, with all of its advantages, the aforementioned art of downrigger trolling as now practiced, is repetitiously cumbersome, laborious, and time consuming, inasmuch as the heavy ball and long dummy line must be raised, the fishing line reattached to the ball, and the ball then re-lowered with the dummy line and fishing line, each time a fish is caught or for any other reason the trolling line separates from its hitch on the ball. The built-in laborious, time consuming procedure is quite disadvantageous, and elimination of all or nearly all of it would greatly facilitate and improve the downrigger method of deep trolling, and such an improvement should accelerate the ongoing increase in popularity of this method of trolling.

SUMMARY OF THE PRESENT INVENTION

In this invention I aim to provide a means in the form of equipment which will, through its use, obviate the necessity for the now practiced repetitious raising and lowering of the downrigger everytime a fish is caught and everytime the lure strikes or temporarily hitches to underwater structure. To provide such a means I have invented a special sinker which can be used as an auxilliary to the downrigger ball, in such a way that the ball would not be needed to translate the fishing line down to the chosen trolling depth. Instead, it would be sent down by the dummy line to that depth before trolling is started, and left suspended there, while auxilliary sinkers are slid down the taut dummy line, carrying the trolling line with them, the function of the ball having changed, to serve as a terminal, a positioner and collector for the auxilliary sinkers. The dummy line would have an additional function, now being also a one-way guide line for the auxilliary sinkers. The new auxilliary sinker would have the trolling line hitched to it, by suitable hitching and unhitching means as when the trolling line was hitched to the ball in the prior art. Thus, multiples of the auxilliary sinker may be stocked close at hand by the fisherman so that he can use them successively one by one as he catches fish.

Once the ball is down in place, the fisherman may take an auxilliary sinker, attach it to the guide line as described hereinafter, then hitch the trolling line to the sinker. By releasing the sinker and the trolling line with lure attached and paying out line from the fishing reel simultaneously, the sinker will be translated by gravity down the guide line to the ball and come to rest on the ball. As the boat moves forward the trolling line will move into the trolling mode, trailing out behind the ball, at approximately the same level as the ball.

When a fish strikes and jerks or tugs the fishing line free from the auxilliary sinker, the latter will remain at rest atop the ball or the previous sinker, if there be one as illustrated in FIG. 2. After the fish is landed and disposed of, the fisherman may merely use another auxilliary sinker and send the lure and line down into the trolling mode, the sinker having made a one way slide down the guide line.

As more fish are caught and the stack of sinkers atop the ball has grown to a reasonable maximum, it will finally become the proper time to raise the ball and its burden of sinkers stacked upon it, remove the sinkers, and place them in a handy place near or upon the downrigger, lower the ball and guide line as in the beginning, and commence the routine as before.

In the present invention I have determined that certain capabilities must be incorporated in the forementioned sinker to enable it to properly and reliably perform the functions which it must. Accordingly, the present invention provides a fishing sinker which, having an integral hand operated locking means for attaching it to the guide line circumventingly and concentrically, so it will be enslaved to the line in a lateral sense, yet freely slidable in a longitudinal sense, and will remain captive to the guide line until unlocked by hand, the said sinker also embodying a suitable hitch, slipjoint, or commonly used releasing means for fastening a fishing line to the exterior of the sinker at any chosen point in the line securely enough to troll a lure attached to the outboard end of the line, and will automatically release the line from the sinker upon the line being tugged upon or jerked as by a fish becoming caught on the lure.

Such characteristics and the necessity for them should be obvious in the foregoing statements herein concerning my invention.

OBJECTS OF THE INVENTION

The main object of my invention is to provide a means for facilitating, and thereby improving the proceedure in the prior art of deep trolling with downriggers, by eliminating the necessity for cyclically raising and lowering the heavy weight suspended on the dummy line a complete cycle, from the depth where the fishing line is being trolled to the boat deck and back, at least once for each fish caught, thereby greatly reducing the time and labor required in the currently practiced art of trolling with a downrigger.

Another object of this invention is to provide a novel, more practical way than using the heavy ball and dummy line and in a direct way as a means to translate the trolling line and lure down to the chosen depth for trolling.

It is another object of this invention to provide a device for accomplishing all of the above mentioned advantageous things which will be as simple operationally and structurally a way to have as few parts as practicable, yet be as effective, reliable, and economical as practicable.

Another object is to provide a comparatively light weight auxilliary sinker which can be used in place of the heavy dummy line sinker for translating the trolling segment of the line and the attached lure down to the chosen depth, where the ball is usually suspended, and into the trolling mode.

Another object is to provide a taut line extending from the downrigger reel mounted on the gunwale of the boat down to the ball at the depth to be trolled, to serve as a guide line down which the auxilliary sinker can slide by gravity when properly attached to said guide line, carrying the trolling line and lure with it.

Another object is to provide such an auxilliary sinker as will slide down the guide line as described hereinabove, taking with it the trolling segment of the fishing line, with lure attached, and into the trolling area, where said sinker will come to rest atop the heavy ball on the guide line, and, after the fishing line has been unhitched from it as by a fish, the sinker will remain atop the heavy ball to be joined by additional similar sinkers and collect in a stack, as fish are repetitively successively caught until, upon accumulating a stack of maximum practical proportions the ball with the stack of sinkers may be raised back into the boat using the guide line and ball, and, may be withheld at the upper level, locked onto the upper part of the unreeled guide line or not but retained at the upper level (i.e., in the boat) while the ball is again lowered to the trolling depth with the guide line, but with no auxilliary sinkers on it. After that the auxilliary sinkers may again be used, one at the time as before, to send the fishing line and lure down the guide line, making it possible to catch "n" number of fish with "n" number of auxilliary, sliding sinkers, while raising the heavy ball with the guide wire from the trolling depth back into the boat only 1/n times.

Another object of my invention is to so facilitate the prior act of deep trolling to catch fish, especially with downrigger equipment such as electric reels and dummy lines with lead balls and other types of heavy weights approximately 5 to 10 pounds or more, so that a considerable increase in sport, efficiency, and productivity in deep trolling may be realized.

Another object of this invention is to provide a mechanical sinker to perform the services described herein easily, quickly, reliably, and efficiently, yet which is simple in construction and economical to manufacture.

BRIEF DESCRIPTION OF THE DRAWINGS

Other objects and structural details, and certain advantages of this invention over the prior art will become apparent from consideration of the accompanying drawings and the ensuing description in which.

DETAILED DESCRIPTION OF THE INVENTION

Figure 1:
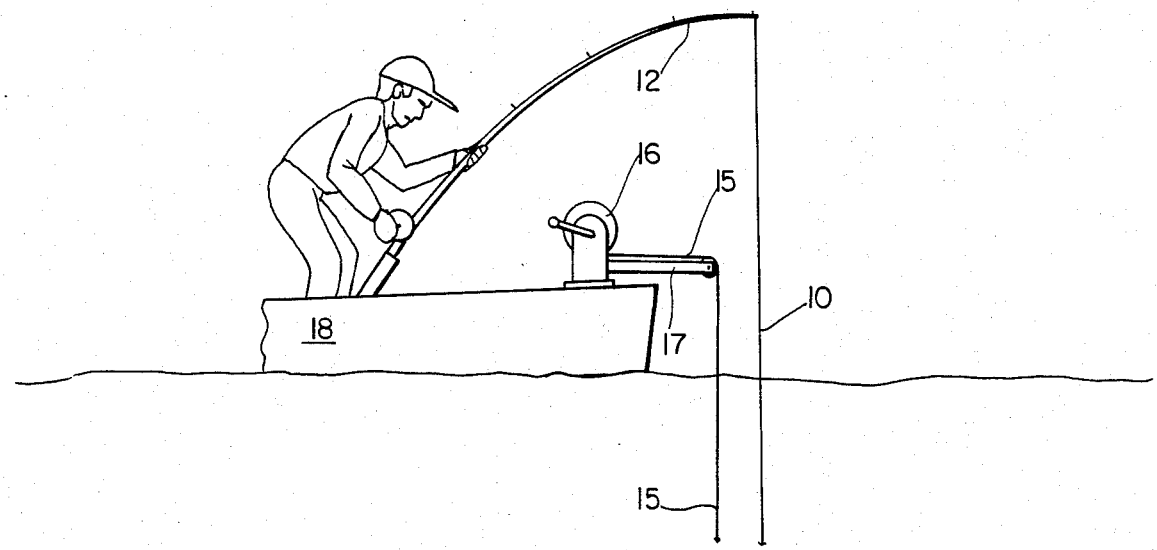
FIG. 1 illustrates downrigger trolling currently practiced today.

Referring now to the drawings, wherein like characteristics and numberal designate like or corresponding parts throughout the several views, there is shown in FIGS. 3 through 7 various views of a preferred configuration of the guided, sliding, auxilliary sinker 100 which I have invented. Assembly 100 shown in FIG. 3 consists of two separable basic pieces, shown clearly in the exploded view of FIG. 7, as follows: A body 1 includes a radially oriented slot 4 extending in depth from top to bottom of the body and in length from the periphery of the body, to a centrally located bore 8. The bore 8 extends from top to bottom through the body 1, and is threaded to mate with the second piece, which is a threaded core 6, which screws into and extends through the body 1 from top to bottom. One end of the core has a torque arm 2 fixed to it. The torque arm 2 extends radially outward from the core 6, at approximately a 90-degree angle to the central axis A-B of the core, to beyond the periphery of body 1 where as it extends further, it is shaped into an open loop or hook-shaped end portion 3. The core 6 has a slot 5 extending radially in depth from the periphery of the core inwardly in a direction normal to the axis of the core a controlled distance beyond the axis of the core equal to at least one half of the width of the slot; or, equal to the radius of the largest diameter guide line this sinker 100 is expected to be used on, plus a reasonable clearance to permit proper sliding operation of the sinker on the guide line. The top-to-bottom depth of the threaded bore 8 is the thickness of the body 1 at the periphery of the core 6. The width of the slot 4 in the body 1 and the slot 5 in the core are approximately the same and are at least as wide as the diameter of the largest of the forementioned guide lines 15' which the sinker 100 might be used on, plus a reasonable amount more for clearance in order to allow the sinker 100 to slide freely on said guide line. Attached to the bottom of body 1 are at least 3 cushioning spacers 7' to protect torque arm 2 when the sinkers are stacked. These spacers are preferably made of a springy material.

Figure 3:
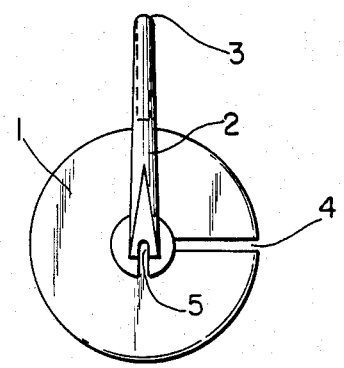
FIG. 3 shows a top view of the inventive sinker.
Figure 4:
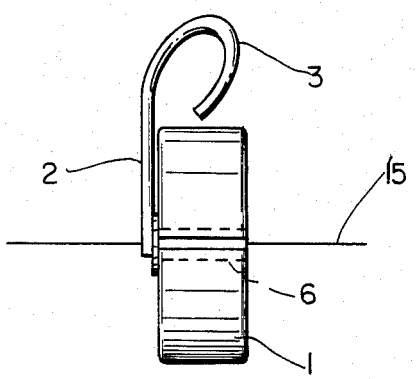
FIG. 4 is a side view of the sinker of FIG. 3.
Figure 5:
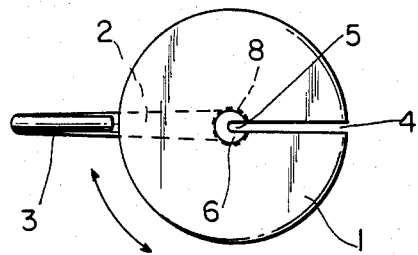
FIGS. 5 and 6 illustrate the locking steps required to lock the sinker of FIG. 3 to a downrigger guide line.
Figure 6:
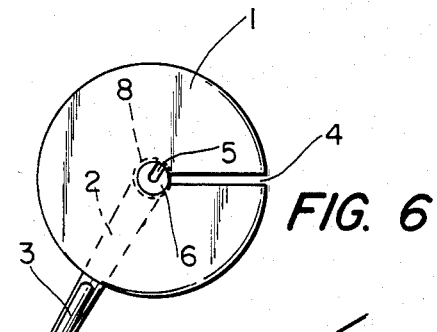
Figure 7:
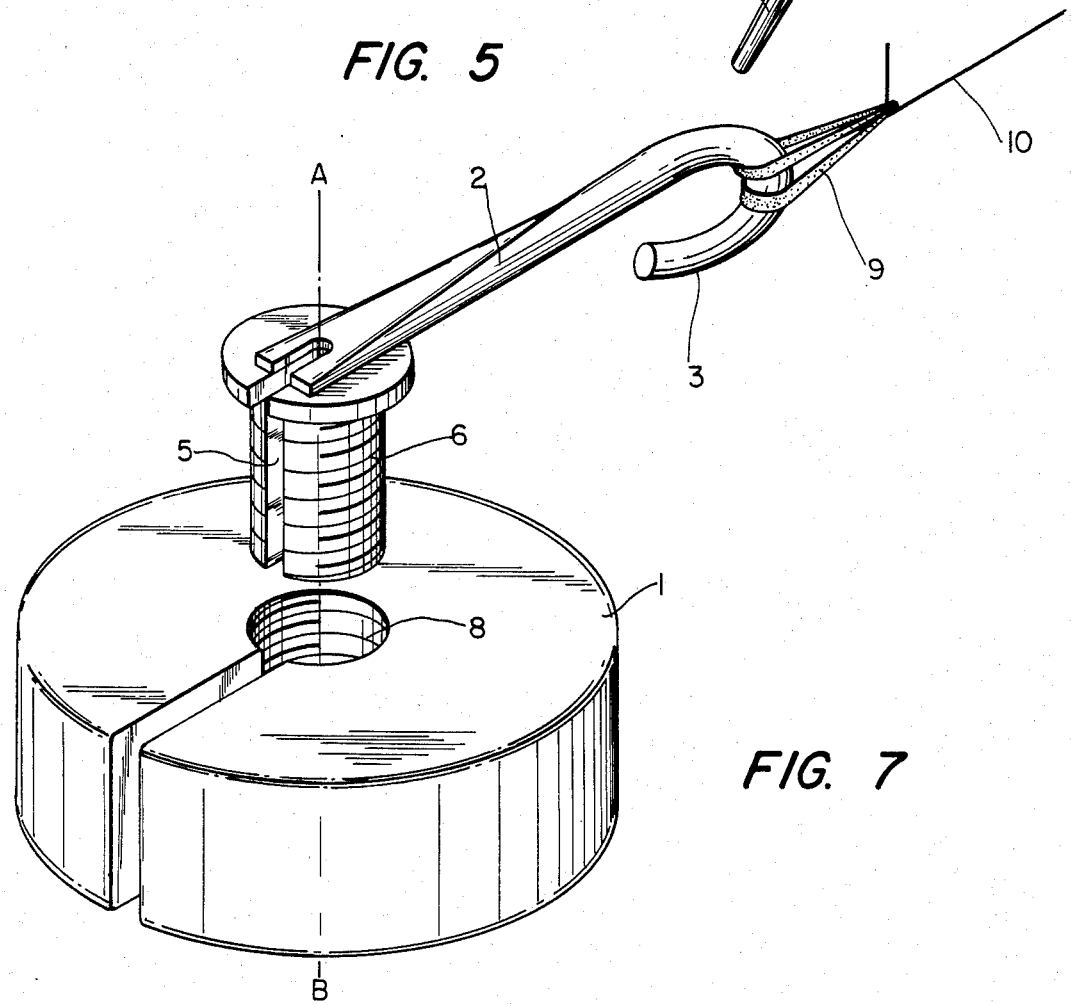
FIG. 7 is an exploded perspective view of the sinker of FIG. 3 illustrating its various components.

FIG. 3 is a top view of the assembly 100. FIG. 4 is a right side view of FIG. 3. FIG. 5 is a bottom view of the assembly 100, showing the core 6 rotated with torque arm 2 so that the slot 5 is fully registering with the slot 4 in body 1. FIG. 6 is a bottom view of the assembly 100 showing the core 6 rotated in the bore, by using torque arm 2, to a position where no part of the slot 5 in the core is registering with the slot 4 in body 1. FIG. 7 is an exploded view of the assembly 100 showing the relationship between the separate parts of the assembly. The core 6, being threaded to mate with the threaded bore 8 may be screwed downward into said threaded bore, utilizing the torque arm 2 of the core.

The screwed fit of core 6 in bore 8 is snug, that is, tight enough to require the torque arm 2 to readily rotate the core, and not loose enough to allow rotation of the core in the bore by any force which might be caused to bear anywhere on the sides of the slot in the core either by the guide line, or by any fish caught on the lure being trolled.

The core 6 is threaded from its free end toward the opposite end, to such an extend that as the core is screwed down into the bore the underside of the torque arm where it joins the core will come in contact with the top surface of the body 1 contigious to the core, causing the core to resist further turning, and finally with a small bit more turning, jamming of the threads of the core in the bore will occur. The slot 5 in the core 6 should register with the slot 4, where it penetrates the bore 8, at about 20 degrees of rotation of the core in the bore before the core becomes locked in the bore, as above described.

Figure 2:
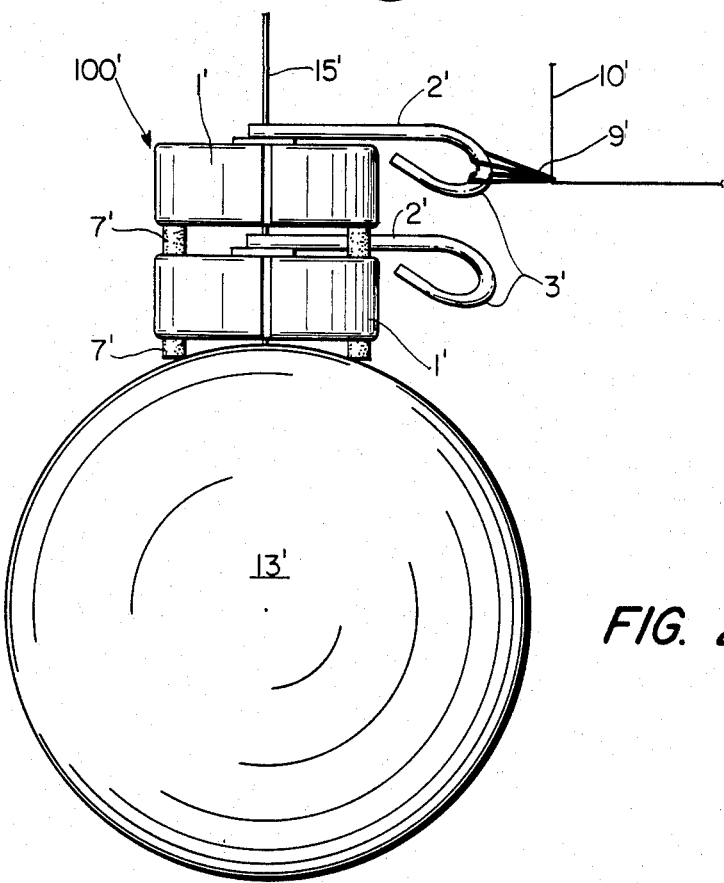
FIG. 2 shows multiple pieces of the present invention stacked on the downrigger weighted ball.

Thus, by holding the torque arm 2 in relation to the body 1 as in FIG. 5 so that the slots in the bore and core register in alignment a totally open radial passageway extending from the periphery of the body 1 to a small way past the axis of rotation of the core will exist; and, the device may, by holding it so that the axis of rotation of the core will be substantially parallel to, for example the guide line 15 or 15' in FIGS. 1 or 2, the said guide line may be moved sideways through said open radial passageway until the guide line coincides substantially with the axis of rotation of the core 6, which is inside slot 5. Next, if the assembly 100 and the guide line 15 or 15' are held in the foresaid position relative to each other while the torque arm is moved so as to rotate the core until the screw threads of the core and the bore jam and lock the core and the bore against further rotation, the slot in the core will be displaced rotationally approximately 20 degrees, the slots 4 and 5 do not register, and the guide line 15 or 15' is totally circumvented by the walls of the slot 5 and that portion of the wall of the bore 8 blocking the otherwise open end of the slot 5 in bore 6. In effect, the sinker assembly 100 is held captive by the guide line, except that the said sinker is free to slide down the guide line by gravity from the downrigger to the terminus of the line at the ball, where, once there it will remain until the ball is brought back into the boat with any others like it atop the ball, by the downrigger reel.

Releasing the forementioned auxilliary sinker from the guide line is very simple—merely take the sinker into one hand and, with the other hand, take hold of the torque arm and release the sinker from the guide line by rotating the core 6 within the bore 8 in a direction counter to that which locked the core from turning in the bore and attaching the sinker onto the guide line. After lining up the slots 4 and 5, the sinker can be moved sideways so the guide line will pass radially outward through the open passageway, and therefore be totally free from the guide line.

ALTERNATIVE EMBODIMENTS AND STRUCTURES

The emodiment and the structure of the invention which I have described and explained herein above constitute the preferred embodiment of my invention. Other ways of accomplishing the objects of this invention have come to mind, and I have evaluated their advantages and disadvantages against those of the embodiment I have submitted herewith as the one preferred. All of these other embodiments which I have conceived will have several things in common, viz:

(1) Shape similar to 1 in FIG. 1, but generally not having the threaded mating center bore and core.

(2) A body slotted from periphery radially to a small amount past the center.

(3) A means for blocking the slot after placing the guide line at or very near the center of gravity of the body, to keep the guide lines enslaved in a small area circumventing the line, yet allowing the sinker to slide freely on the line.

(4) The slot may be blocked by the following means:

a. By boring a radially alined hole centering on the centerline of the slot, so a round pin may be inserted in this bore radially toward the center of gravity of the body the proper distance, the periphery-to-center slot may be effectively blocked so as to enslave the guide line equally well as in the preferred embodiment. Now, by providing a larger diameter section on the pin, that part of its length (when it is fully inserted in the bore) from the periphery of the sinker inward for a distance equal to one or two diameters of the pin is larger in diameter than the rest of the pin and is threaded, and also a length of the bore for the slot blocking pin is counter bored and threaded to mate with, that is, to receive, the outward threaded section of the pin, then this pin could be first inserted in the bore and pushed in until the male threads on the pin meet the mating female threads in the sinker body 1, then the pin is screwed home, thereby very effectively blocking of the slot. By screwing the pin inward until the threads bottom and jam, the pin will be effectively locked against ordinary forces causing the pin to loosen and back out. Additionally, if the outward portion of the pin were made long enough to project beyond the periphery of the sinker body 1 and shaped into an open loop which may be utilized as a hitch like 3 in FIG. 7, then a very efficient auxilliary sinker, as an alternative to the assembly 100 in FIG. 3, for use in downrigger trolling as described in the hereinabove describes preferred embodiment. A disadvantage vantage of this alternative embodiment would be that it is made of two functional parts which must be separated from each other in order to use them, as in attaching the assembly to a guide line. This would be conducive to inefficient handling, perhaps dropping parts overboard.

(4) b. Another alternative would be to dispense with the core 6 and bore 8, and provide a slot equal in length to slots 4 and 5 in body 1 (see FIG. 7); then, provide a flat spring clip made by doubling back on itself a flat piece of springy metal, approximately as wide as the top to bottom depth of slot 4 in FIG. 7, and long enough for the doubled end to be shoved as deep as required radially into slot 4 to provide the proper entrapment of the guide line near the center of gravity of the sinker, and to extend radially outward past the periphery of the sinker far enough for such extension to provide enough material with which to form spring compressing handles. The spring clip could then be pressed closed and the double end shoved into the slot 4 the proper distance, then released, so the spring clip would tighten against the sides of the slot 4 and hold the clip in place, effectively locking the sinker guide line entrapment means.

Both of the alternative embodiments described in paragraphs (1) through b (4) b above have an important common disadvantage, not to mention others not necessarily common to both. The common fault is that they unlike assembly 100 in FIG. 3, require separation of the device into two or more parts in order to use the assembly as intended. Such separation will decrease the efficient handling of the device, causing fumbling, and dropping of parts.

It is to be understood that the illustrated embodiments are not all-inclusive of the scope of the present invention, but to improve the understanding of the nature of the invention, and that the invention includes variations and modifications and substitutions of equivalents obvious to a person skilled in this particular field.

What I claim as my invention is:

1. For use with fishing apparatus including a weighted sinker for establishing a fishing depth and a line supporting the sinker from a support, an auxiliary sinker for positioning fishing line means on the sinker line at the fishing depth, comprising:
    a body having a centrally located bore, and slot means extending from a peripheral location to said bore for loosely guiding said sinker line into said bore;
    a core element having means for lockingly cooperating with the wall of the bore, and including means, cooperating with said bore wall, for loosely capturing said sinker line in said core, and
    means, attached to and extending away from said core element, for coupling said fishing line means with said sinker line,
    whereby upon guiding said sinker line through said slot into said bore and locking said core element in said bore, said auxiliary sinker is coupled to said sinker line and free to slide therealong to said fishing depth.

2. The auxiliary sinker of claim 1 wherein both said bore and said core element define a longitudinal axis, and said axes are coaxial in all engaged positions.

3. The auxiliary sinker of claim 2 wherein said axes define axes of symmetry, and said core element is supported for rotation within said bore.

4. The auxiliary sinker of claim 2 wherein said capturing means comprises groove means in said core element extending radially from a peripheral location toward said longitudinal axis.

5. The auxiliary sinker of claim 4 wherein the width of the groove means in said core element is greater than the diameter of said sinker line to facilitate sliding thereof through said core element groove means, and said coupling means comprises a fishing line hitching means.

6. The auxiliary sinker of claim 1 wherein said capturing means comprises groove means extending from a peripheral location radially toward a central location, said core element being supported within said bore for movement between a first position wherein said body slot means and said core element groove means are in alignment, to at least one other position wherein said body slot means and said core element groove means are misaligned,
    whereby said first position permits attachment of said auxiliary sinker to said sinker line, and said at least one other position permits the entrapment of said sinker line within said body so that said sinker line is loosely slidable through said groove means.

7. The auxiliary sinker of claim 6 wherein the surfaces of of said bore and said cooperating means comprise thread means, and said core element rotates within said bore via said thread means between said first position and said at least one other position.

8. The auxiliary sinker of claim 6 wherein one of said other positions locks said core element within said bore.

9. The auxiliary sinker of claim 8 wherein said one position is disposed at an angle of about 20° from said first position.

10. The auxiliary sinker of claim 7 wherein one of said other positions jams said thread means and locks said core element within said bore.

11. For use with fishing apparatus including a weighted sinker for establishing a fishing depth and a line supporting the sinker from a support, an auxiliary sinker for positioning fishing line means on the sinker line at the fishing depth, comprising:
    a body having a centrally located bore, and slot means extending from a peripheral location to said bore for loosely guiding said sinker line into said bore;
    a core element having means for lockingly cooperating with the wall of the bore, and including means, cooperating with said bore wall, for loosely capturing said sinker line in said core, and
    means extending away from said bore for coupling said fishing line means with said sinker line, said coupling means comprising an arm integral with said core element and disposed substantially normal to said bore, said fishing line being attached to said core element outside the periphery of said body,
    whereby upon guiding said sinker line through said slot into said bore and locking said core element in said bore, said auxiliary sinker is coupled to said sinker line and free to slide therealong to said fishing depth.

12. An auxiliary sinker for use with a downrigger suspension line, comprising:
    a body having a centrally disposed bore and means, extending between a peripheral location and the bore, for guiding said suspension line from said location into said bore, and
    a core element including means for locking said element in said bore and means, cooperating with the wall of said bore, for capturing said suspension line in said core element while permitting said auxiliary sinker to freely slide along said suspension line when coupled thereto, said core element further including means, extending away from said body, for attaching a fishing line to the core element.

13. A method of attaching the auxiliary sinker of claim 12 to a suspension line with only one hand, comprising:
holding said sinker with said one hand;
moving said sinker toward said line so that said line enters, and passes through, said guiding means into said capturing means;
inserting said line into said capturing means; and
causing said locking means to lock using only one finger of said one hand.

14. The auxiliary sinker of claim 12 wherein said attaching means comprises an arm integral with said core element and disposed substantially normal to said bore, and wherein said fishing line is attached to said core element outside of the periphery of said body.

* * * * *